United States Patent [19]

Johnson et al.

[11] 4,402,874

[45] Sep. 6, 1983

[54] PROCESS FOR THE PREPARATION OF PROTEIN ISOLATES OF IMPROVED QUALITY FROM VEGETABLE PROTEIN SOURCES USING ALKALI METAL BOROHYDRIDES

[75] Inventors: Lawrence A. Johnson, College Station, Tex.; Hwei-mei Wen, Taipei, Taiwan

[73] Assignee: Thiokol Corporation, Chicago, Ill.

[21] Appl. No.: 456,667

[22] Filed: Jan. 10, 1983

[51] Int. Cl.$^3$ .............................................. A23J 1/14
[52] U.S. Cl. ............................ 260/123.5; 260/112 R; 426/656
[58] Field of Search ........................ 260/123.5, 112 R

[56] References Cited

U.S. PATENT DOCUMENTS 2,380,020  7/1945  Brother et al. .............. 260/123.5 X

OTHER PUBLICATIONS

J. of Agricultural Food Chemistry, vol. 25, pp. 822–825, (1977), Sodini et al.
Cereal Chemistry, vol. 25, pp. 399–406, (1948), Smith et al.

Primary Examiner—Howard E. Schain
Attorney, Agent, or Firm—Gerald K. White

[57] ABSTRACT

Protein isolates are recovered from vegetable protein sources, such as for example sunflower meal, by extracting the meal with an alkali solution in the presence of an alkali metal borohydride, and then acid precipitating the resulting aqueous protein extract phase to produce a protein isolate. Typically, the alkali metal borohydride is employed in an amount of at least about 20 ppm, based on the combined weight of vegetable meal and alkali solution. Protein isolates produced by this process exhibit improved color, palatability and/or nutritional value, and comprise highly desirable additives for food products, animal foods, etc.

9 Claims, No Drawings

PROCESS FOR THE PREPARATION OF PROTEIN ISOLATES OF IMPROVED QUALITY FROM VEGETABLE PROTEIN SOURCES USING ALKALI METAL BOROHYDRIDES

BACKGROUND OF THE INVENTION

The present invention relates to a process for the preparation of protein isolates having improved physical characteristics such as color, nutritional value and/or palatability (including flavor, taste and/or odor) from vegetable protein sources such as vegetable meals and flours. It particularly relates to an improved process for the preparation of protein isolates from vegetable protein sources of the type in which the vegetable protein source is contacted with alkali to extract protein therefrom, and the resulting aqueous protein extract phase is thereafter precipitated with acid to produce a protein isolate.

When oil is expelled from oilseeds, such as for example soybeans, sunflower seeds, etc., by techniques well known to those skilled in the art, a resulting by-product is a protein-containing material which is known as a vegetable meal, e.g. soybean meal, sunflower meal, etc. As is also well known in the art, this vegetable meal may be ground to produce a flour, typically containing about 50 percent protein. The vegetable meal and/or flour, due to its high protein content, has the potential of being a valuable nutritional source, capable of use as additives in a variety of food and feed applications. Sunflower protein is particularly desirable in this regard because of the well-balanced profile of essential amino acids (except for low lysine content), the absence of any known anti-nutritional factors, and relatively good flavor characteristics.

One method heretofore known for isolating protein from vegetable protein sources such as various oil seed meals and flours involves alkali extraction of the meal to extract protein therefrom followed by acid precipitation of protein from the aqueous protein extract phase. In the alkali extraction step, the meal is first admixed with water, the weight ratio of water to meal ordinarily ranging from about 10:1 to 30:1, typically comprising about 20:1. The pH of the water is then adjusted to range from 8.5 to 10 by the addition of a strong base, for example, an alkali metal hydroxide such as sodium hydroxide. The meal/alkaline water mixture is then agitated, typically for about one hour, whereby protein and some non-protein impurities are extracted from the meal to form a liquid protein extract phase and a solid residue of spent meal. The extract phase which is a solution comprising water, protein, and non-protein impurities is then separated from the spent meal, for example, by centrifugation. This extract phase is then treated in an acid precipitation step. In this step, the pH of the extract phase is adjusted to range from 4.5 to 4.7 by the addition of an acid, for example, hydrochloric acid. This pH adjustment step, that is, the addition of the acid, precipitates protein from the liquid extract phase. It is preferable that the pH of the extract phase be adjusted to 4.5 by the addition of the acid since pH 4.5 is the isoelectric point of the protein, that is the point where the protein is least soluble in water, and at this point therefore the most protein is recoverable from the liquid extract phase by an acid precipitation technique. The precipitated protein is then recovered from the acid-adjusted extract phase by any convenient physical separation method, for example, by centrifugation, producing a liquid supernatant fraction commonly called the whey, and a precipitated protein fraction referred to as the acid curd. The acid curd is then typically neutralized to pH 7 by the addition of a suitable base, such as sodium hydroxide, and then spray dried to produce a dry protein isolate, which usually has a protein concentration of greater than 90%. Typically, the protein isolation procedure is also carried out at temperatures, ranging 20°–45° C.

With the alkaline extraction/acid precipitation procedures of the prior art, however, protein isolates are produced having less than desirable physical characteristics which have limited the suitability of the protein isolate in food applications. The protein isolates produced by the prior art alkaline extraction/acid precipitation procedures, for example, have exhibited objectionable off-colors, odors and flavors, which have severely restricted the applicability of the protein isolate in human food applications. Sunflower protein isolates are particularly notable in this regard, ordinarily having an intense green color which cannot be removed from the isolate product by dialysis or other conventional means of purification. If the intensely colored isolate is added to food products as a protein supplement additive, the green color is imparted to the food product so that it is characterized either by a green cast or by a green color, which is ordinarily considered unappetizing. As a result, protein isolated by conventional techniques from sunflower meal is not ordinarily useful in human food applications. In addition to the problem of green color formation, sunflower protein isolates have also been characterized by an unattractive and grassy flavor.

While the off-color problem is most severe with sunflower protein isolates, less extensive off-colors also occur in all vegetable protein isolates, including soy protein, which have limited to various extents the suitability of such protein isolates in food applications. Many of these protein isolates also suffer from severe off-flavor problems, which have further restricted their use in many food applications. The soy protein industry, for example, has major problems in controlling off-flavors from lipoxygenase-catalyzed lipid oxidation which frequently precludes soy protein utilization in many food applications.

Heretofore, a number of attempts have been made in order to overcome the aforementioned disadvantages of the conventional alkaline extraction/acid precipitation protein isolation technique. U.S. Pat. No. 3,622,556, for example, teaches a modified alkaline extraction/acid precipitation technique wherein green color formation in sunflower protein isolates is minimized by extracting the sunflower meal under an inert gas blanket, such as nitrogen, and then passing the resulting liquid protein extract phase through an ultrafiltration membrane prior to the acid precipitation step. While use of this modified process has resulted in sunflower protein isolates having improved color, this process has required the use of special expensive equipment which has prevented the use thereof on a commercial basis.

In addition, various reducing agents have also been employed during the alkali extraction step in order to minimize off-color formation. Smith et al, *Cereal Chemistry*, Vol. 25, pages 399–406 (1948), for example, indicates that green color can be temporarily removed from sunflower protein isolates by the use of reducing agents such as dithionate salts during alkali extraction. While protein recovered after the use of this reducing agent may initially be light colored, the green color reappears if the isolated protein is utilized as a supplement in foods with even a slightly basic pH. Similarly, Gheyasuddin et al, *Food Technology*, Vol. 24, page 242 (1970), discloses that a colorless sunflower protein isolate may be prepared by treating the soluble sunflower protein with sodium sulfite and then washing the protein acid curd with 50% isopropanol. The protein isolate produced by this procedure, however, develops an objectionable brown color at pH's above 7.5.

Various pretreatment operations have also been proposed in the prior art in order to remove the various color-forming and other impurities from the vegetable protein source prior to alkali extraction. The aforementioned Smith, et al, *Cereal Chemistry*, article, for example, reports the use of hot 70% ethanol and absolute methanol for extracting chlorogenic, caffeic and quinic acids from sunflower meal. It has been found, however, that complete extraction of the color-forming phenolic acids from sunflower meal requires refluxing or shaking for several hours, which has rendered the use thereof undesirable. Various other pretreatments for the purpose of removing color-forming phenols from sunflower meals are also reported in Sodini et al, *Journal Agricultural Food Chemistry*, Vol. 25, page 822 (1977); Rhee et al, Final Report to U.S.D.A., ARS, Athens, Georgia, Research Agreement No. 12-14-7001-847 (1979); and Bau et al, 182nd National Meeting of American Chemical Society, Division of Agricultural and Food Chemistry, New York, New York (1981). While each of these various pretreatments has proven successful to a certain extent in removing bound color-forming phenolic compounds from the sunflower meal, none of these methods has proven commercially viable.

SUMMARY OF THE INVENTION

Accordingly, it is an object of the present invention to provide an improved process for the preparation of vegetable protein isolates having enhanced quality characteristics including color, flavor, odor and/or nutritional characteristics.

It is a particular object of the present invention to provide an improved process for the preparation of vegetable protein isolates of the alkali extraction/acid precipitation type which yields protein isolates of food grade and quality.

It is a specific object of the present invention to provide an improved process for the preparation of sunflower protein isolates which eliminates the problem of green color formation and yields a protein isolate of improved suitability for use in food applications.

In accordance with the present invention, these and other objects are achieved through the provision of a novel process for the preparation of protein isolates from vegetable protein sources wherein the vegetable protein source is extracted with alkali in the presence of an alkali metal borohydride, followed by acid precipitating the resulting liquid protein extract phase to produce a protein isolate. The alkali metal borohydrate is employed in an amount sufficient to improve the flavor, palatibility (i.e., flavor, taste and/or odor) and/or nutritional characteristics of the resulting protein isolate. Typically, amounts of alkali metal borohydride of at least 20 ppm and more often from about 50 to about 500 ppm of alkali metal borohydride, based on the combined weight of the meal and alkaline solution, are suitable for this purpose.

In the preferred embodiment, further improvements in protein isolate quality are obtained by alkali extracting the vegetable protein source in the presence of the alkali metal borohydride under low extraction time, high temperature conditions. Typical operating conditions in accordance with this preferred mode of operation include an extraction time of less than about 30 minutes, and most preferably less than 10 minutes, and a temperature of from about 45° to 55° C., together with from about 50 to about 500 ppm of alkali metal borohydride, and most preferably with from about 75 to about 200 ppm of alkali metal borohydride, based on the combined weight of the vegetable meal and alkaline solution. It has been surprisingly found that the combined alkali metal borohydride/short extraction time/high extraction temperature conditions of this embodiment of the present process further improves the quality of the vegetable protein isolate over that produced by alkali extracting under conventional conditions in the presence of the alkali metal borohydride. This discovery is contrary to expectations, since it would have been expected that the higher temperatures employed in this embodiment would have increased, rather than decreased the extent of color formation in the protein isolate.

Protein isolates produced by the present invention exhibit improved palatability and nutritional value as demonstrated by animal feeding experiments, and in addition exhibit improved color. Protein isolates produced by the present invention, for example, typically exhibit a color, as measured by a Hunter Colorimeter, characterized by an L-value of greater than about 60, and preferably greater than about 68, an a-value of greater than about −4.0, and preferably of greater than about −2.0, and a b-value of greater than about 1.5. As a result of these improved characteristics, the protein isolates produced in accordance with the instant invention can readily be employed in a variety of food applications, as well as in any of the various other utilities in which protein isolates find application.

Other objects, features, and advantages of the present invention, as well as the preferred modes of operation, will become apparent to the skilled artisan upon examination of the following detailed description.

DETAILED DESCRIPTION OF THE PREFERRED EMBODIMENTS

The process of the present invention is suitable for use with any of the various vegetable protein sources well known to those skilled in the art. Typically, the vegetable protein source is a defatted vegetable meal which is prepared from various oil seeds, such as for example, soybean, sunflower, glandless cotton, safflower, lupine, peanut, sesame, rapeseed and canola. The preparation of vegetable meals is well known to those skilled in the art and typically involves extraction of the oil seed material, in a comminuted or flaked form, with hexane, followed by air desolventization. The residue left after the defatting operation is the vegetable meal which comprises the vegetable protein source typically employed in the process of this invention. The particular procedure for preparing the vegetable meals employed herein is not particularly critical, however, and any of the various other art recognized procedures may also be utilized for this purpose, such as aqueous extraction procedures, as well as the various procedures described in *Bailey's Industrial Oil and Fat Products*, Third Edition, pages 663–713 (1964), John Wiley and Sons, New York. The vegetable meal may, in addition, be in the form of a meal per se, or alternatively may be ground into a flour. Accordingly, as used herein the term "meal" is employed in a generic sense to refer to the protein-containing residue remaining after defatting, whether it be in a meal form per se or in the form of a flour.

Due to the severe green color formation problem associated with sunflower seeds, the invention process if particularly advantageous for use in the preparation of high quality protein isolates from sunflower meals. Suitable sunflower meals may be derived from any variety of sunflower seeds known to those skilled in the art such as Amvaric, Peredovik, Smena or Mingren. Preferably, sunflower seeds are first dehulled prior to defatting.

In addition of improving the color of sunflower isolates, the instant process has also been unexpectedly found to improve the color of sunflower isolates, producing sunflower isolates having a bland smell rather than the typical grassy-like smell of isolates prepared by the procedures of the prior art. Animal feeding studies have indicated that sunflower isolates prepared in accordance with this invention also exhibit improved palatability and nutritional characteristics.

While the problem of color formation is most severe with sunflower isolates, all vegetable protein isolates, including soy, are subject to the development of off-colors, and accordingly may likewise benefit from the procedures of this invention. In addition, many of these various other conventional protein isolates exhibit pronounced off-flavors which can be ameliorated by the isolation procedure of this invention. Soy protein isolates, for example, exhibit a pronounced off-flavor resulting from lipoxygenase-catalyzed lipid oxidation, which may be improved by procedure of this invention.

As described above, in accordance with the present invention, protein isolates are prepared from the aforementioned vegetable meals, or other conventional vegetable protein sources such as are well known to those skilled in the art, by an alkaline extraction/acid precipitation procedure wherein the alkaline extraction step is conducted in the presence of an alkali metal borohydride. The alkali extraction/acid precipitation procedure may be operated under conventional operating conditions and may include any of the improvements and modifications such as are well known to those skilled in the art, provided that such improvements are compatible with the use of the alkali metal borohydride required by this invention. In the typical embodiment, the vegetable meal, such as for example sunflower meal or flour, is admixed with water, alkali, and alkali metal borohydride, and then agitated to produce a spent vegetable meal phase and a liquid protein extract phase. Preferably, the vegetable meal is first admixed with water to wet the same, following which the alkali and then the alkali metal borohydride are added to the mixture in sequential fashion. It is preferred to conduct the alkali extraction step in this fashion since the alkali metal borohydride is more stable at alkaline pH. In an alternative preferred mode of operation, the alkali metal borohydride may be dissolved in the alkali, the combined mixture being then added to the water wetted meal. In this embodiment, aqueous alkali metal borohydride solutions, such as SWS ®, a commercial aqueous sodium borohydride solution marketed by the Morton-Thiokol Corporation containing about 12% sodium borohydride and about 40% sodium hydroxide, may effectively be employed, provided the total amount of alkali added to the metal is adjusted to reflect the alkali provided by the aqueous alkali metal borohydride solution.

In the typical mode of operation described above, the weight ratio of vegetable meal to water typically ranges from about 10:1 to about 30:1, preferably from about 15:1 to about 22:1, and most usually is about 20:1. The alkali is employed in an amount sufficient to adjust the pH of the admixture within the range of from about 8.5 to 10, preferably from about 9 to about 9.5, and is preferably of food grade quality.

The alkali metal borohydride employed during the alkali extraction step is used in an amount sufficient to effect an improvement in the quality of the resulting protein isolate. The exact amount required for this purpose varies with the particular vegetable meal being treated and with the particular characteristic of the protein isolate which requires improvement, e.g., color, flavor, odor, taste, palatability, nutritional characteristics, etc. Preferably, the alkali metal borohydride is used in an amount sufficient to provide a protein isolate having a Hunter Colorimeter color characterized by a L-value of greater than about 60, an a-value of greater than about $-4.0$, and a b-value of greater than about 1.5. Protein isolates having such Hunter Colorimeter characteristics exhibit visually a whitish color and have an acceptable color for human food use. Most preferably, however, the alkali metal borohydride is used in an amount sufficient to produce a protein isolate having a Hunter Colorimeter color characterized by a L-value of 68 or more, an a-value of $-2.0$ or more, and a b-value of about 1.5 or more. Such protein isolates are particularly suitable for use in human food applications.

The preparation of protein isolates having the aforementioned characteristics has typically required an amount of alkali metal borohydride of at least 20 ppm based on the combined weight of the vegetable meal and extracting alkaline solution in contact therewith. For the purposes of the present invention, the weight of the extracting alkaline solution corresponds to the sum of the water and alkali admixed with the vegetable meal. Preferably, the alkali metal borohydride is in contact with the vegetable meal in an amount of from about 50 to about 500 ppm, and most preferably from about 75 to 200 ppm, based on the combined weight of water and extracting alkaline solution.

The alkali metal borohydride may be such as for example lithium, potassium, or sodium borohydride. Of the alkali metal borohydrides, the sodium derivative is commercially most readily available. The alkali metal borohydride may be added to the process of this invention either in solid form, or as discussed above, as an aqueous solution. If desired, the alkali metal borohydride may also be formed in situ from other borohydrides.

The alkaline extraction step is suitably conducted at a temperature of from about 5° C. to about 70° C., preferably from about ambient to about 65° C., and most preferably from about 45°–55° C. Extraction of the vegetable meal with the water/alkali/alkali metal borohydride solution generally comprises less than about 2 hours, preferably less than about 30 minutes, and most preferably less than about 10 minutes, each of the aforementioned times being based on the time that the meal is in contact with the alkali and alkali metal borohydride. In the preferred embodiment, the extraction is preferably conducted at a temperature of from about 45° to 55° C. and for a time period of less than about 30 minutes, and preferably about 10 minutes or less. In accordance with the present invention it has been unexpectedly found that the combination of these conditions plus the alkali metal borohydride reducing agent produces a protein isolate having particularly significant improvements in quality. This improvement is unexpected since the use of high extraction temperatures would have been expected to result in greater off-color formation, and thus in protein isolates of lower quality.

Further improvement in the quality of the protein isolate may be obtained through the use of a sealed reactor system, degassed water, and/or an inert gas such as is described in U.S. Pat. No. 3,622,556, the entirety of which is herein incorporated by reference and relied on in the entirety.

Following the alkaline extraction step, the vegetable meal/water/alkali/alkali metal borohydride mixture is separated, for example, by centrifugation, into the spent meal phase and the liquid protein extract phase. In conventional manner, the vegetable protein is then precipitated from the liquid protein extract phase by adjusting the pH of the liquid protein extract phase to the isoelectric point of the protein with a suitable food grade acidulant, such as for example concentrated hydrochloric acid. The isoelectric point of the protein will vary according to its vegetable source, but typically lies within the range of from about 4.5 to 4.7. The precipitated protein is thereafter separated from the supernatant liquid by centrifugation or other art recognized separatory procedure, to produce an acid curd and a whey. Neutralization of the acid curd with alkali to pH 7, such as for example with concentrated sodium hydroxide, and then drying, for example spray drying, yields the dry protein isolate. Preferably, the acid curd is also washed with water after the neutralization step.

In addition to the procedures described above, the inventive concepts of the present invention may also be applied to any of the various other alkaline extraction/acid precipitation processes known to those skilled in the art. One such process comprises a sequential extraction procedure whereby both non-storage and storage fraction protein isolates are obtained. In the sequential extraction procedure, the vegetable meal is first extracted at natural pH, such as for example a pH of 6.8 to 7, to produce a first liquid protein extract phase and a first solid residue phase. Acid precipitation at pH 4.5 of the first liquid protein extract phase yields a protein isolate comprising the non-storage fraction of the vegetable meal protein. Isolation of the storage fraction protein present in the vegetable meal is then accomplished by extracting the first solid residue phase at pH 9 to produce a second liquid protein extract phase, which upon precipitation of pH 7 yields the storage fraction protein isolate. In this embodiment, the alkali metal borohydride treatment is employed during the pH 9 extraction of the vegetable meal residue. It has been found that the alkali metal borohydride need not be present during the extraction at natural pH in order to produce a high quality protein isolate. Optionally, the first solid residue phase may be extracted a second time at natural pH prior to the pH 9 extraction in order to improve the yield of the non-storage fraction protein isolate.

Another type of procedure which may be practiced in accordance with the present invention comprises the single extraction/sequential precipitation procedure. According to this technique, the vegetable meal is extracted at a pH of about 9 in order to produce a liquid protein extract phase. Acidification of the liquid protein extract phase to pH 7 precipitates the storage fraction protein, which may then be recovered in the form of a protein isolate by conventional procedures. The non-storage fraction protein is obtained as a protein isolate by reacidifying the liquid protein extract phase to pH 4.5.

The invention is additionally illustrated in connection with the following Examples which are to be considered as illustrative of the present invention. It should be understood, however, that the invention is not limited to the specific details of the Examples.

EXAMPLE I

A series of protein isolates, identified as Runs I-V, were prepared from sunflower flour and the color thereof evaluated by a Hunter Color Difference Meter Model D25D2, standardized using a standard white plate having an L-value of 94.2, and a-value of $-1.1$ and a b-value of 1.9. The sunflower flour employed in the isolation of each of these protein isolates was prepared by flaking dehulled sunflower kernels and extracting the flaked kernels with hexane in a batchwise fashion at room temperature (24° C.). The resulting defatted meal was air desolventized without heat application and then ground to produce the final flour.

The protein isolate of Run I comprised a comparative experiment which was prepared without the use of alkali metal borohydride. Alkali extraction was accomplished by adding 159.0 kg of tap water heated to 49° C. to 7.95 kg of the above-described sunflower flour (corresponding to a weight ratio of water to flour of 20:1), and then mixing for 10 minutes with vigorous agitation to thoroughly wet the sunflower flour. The pH of the resulting mixture was then adjusted to pH 9 with 50% NaOH and extracted for 10 minutes with vigorous agitation. A liquid protein extract phase was thereafter recovered by centrifugation. The protein present in the extract was precipitated by adjusting the pH of the extract phase to pH 4.5 with concentrated HCl. The resulting precipitated protein (acid curd) was separated from the supernatant by centrifugation, neutralized with 50% NaOH to pH 7.0, and then spray dried to produce a dry protein isolate.

The protein isolate of Run II was prepared by the identical procedure of Run I except that 7.72 kg of sunflower flour was wetted with 154.4 kg of 49° C. tap water. In addition, the alkali extraction step comprised a modified alkali extraction in accordance with the present invention wherein following the addition of the water, the pH was first adjusted to pH 7.0 with 50% NaOH. 200 ppm (33.25 g) of powdered NaBH$_4$ were thereafter added to the mixture and the pH adjusted to pH 9 with 50% NaOH, following which the sunflower flour was agitated, acid precipitated and recovered as a dry protein isolate identically to the procedure of Run I.

The Run III protein isolate was prepared by the procedure of Run II except that the alkali extraction step was modified by the use of degassed 49° C. tap water as the solvent. In addition, the extraction time and agitation were reduced by mixing with slow agitation and then centrifuging immediately after adjustment of the pH to pH 9.0. As in Run II, 200 ppm of NaBH$_4$ were present during extraction. The degassed water was prepared by boiling tap water for 30 minutes.

In an improved variation of Run I, the protein isolate of Run IV was prepared from 7.95 kg of sunflower flour by a modified alkali extraction employing the degassed water and reduced extraction time and agitation of Run III. In accordance with this run, the sunflower flour was wetted with 79.5 kg of the degassed 49° C. water of Run III and then mixed therewith for 10 minutes with slow agitation. In a separate vessel, 120 ml of 50% NaOH were added to 79.5 kg of degassed 49° C. water. The basified degassed water was then added to the wetted flour, yielding a total water to flour weight ratio of 20:1, and the pH of the resulting mixture adjusted to pH 9 with 50% NaOH while mixing with slow agitation. Centrifuging occurred immediately thereafter as in Run III. In contrast to Run III, however, no $NaBH_4$ was present during the alkali extraction step.

The Run V protein isolate was prepared identically to Run IV except that the alkaline extraction was conducted in the presence of 200 ppm of $NaBH_4$, and the quantities of sunflower flour, water and alkali were slightly reduced. Similarly to Run IV, a first portion of 77.2 kg of degassed 49° C. water were added to 7.72 kg of sunflower flour and then mixed therewith for 10 minutes with slow agitation. An alkaline $NaBH_4$ solution in degassed water was then prepared in a separate vessel by adding 110 ml of 50% NaOH to the second 77.2 kg portion of degassed water, following which 200 ppm of powdered $NaBH_4$ (33.25 g) were dissolved therein. The alkali/$NaBH_4$ solution was then combined with the flour/degassed water mixture, and the pH adjusted to pH 9 as in Run IV while mixing with slow agitation. The resulting admixture was then centrifuged immediately and processed into a protein isolate identically to Run IV.

The results of these experiments are set forth in Table I below.

TABLE I

| Sample | Hunter color value | | | Visual color |
|---|---|---|---|---|
| | L | a | b | |
| Flour Dried isolate (at pH 7) | 82.3 | 0.3 | 6.1 | white |
| Run I | 38.7 | −6.1 | −4.6 | dark blue-green |
| Run II | 59.4 | −3.0 | 6.5 | light green-yellow |
| Run III | 70.2 | 0.5 | 9.1 | yellow-white |
| Run IV | 60.4 | −3.8 | 6.2 | light green-yellow |
| Run V | 67.7 | −0.1 | 8.7 | yellow-gray |

As can be seen from a comparison of Runs I and II of this table, Run II, a process in accordance with this invention, produced a protein isolate having a substantially whiter color than the protein isolate of Run I, which was prepared identically therewith except for the use of $NaBH_4$ during the alkali extraction step. Moreover, as can be further seen from Runs III and V, further improvements in protein isolate quality are obtainable through the use of degassed water in combination with $NaBH_4$ during the alkali extraction step. In this regard, the color of the protein isolate of Run III is particularly notable, being comparable to that of soy isolates, a feat heretofore thought to be impossible.

In order to evaluate the nutritional characteristics of the protein isolates produced in this Example, the protein isolate of Run V was formulated into a diet for use in rat feeding studies. As a control similar diets were prepared from the protein isolates of Runs I and IV. Each of these diets contained 10.0% protein, 8.0% fat, 1.0% fiber, 5.0% ash, and 5.0% moisture. The exact composition of each of these diets is set forth in Table II.

TABLE II

| Component | Diet 1 | Diet 2 | Diet 3 | Diet 4 |
|---|---|---|---|---|
| Casein | 11.14 | — | — | — |
| Run I sunflower isolate | — | 11.19 | — | — |
| Run IV sunflower isolate | — | — | 10.46 | — |
| Run V sunflower isolate | — | — | — | 10.31 |
| Corn oil | 7.91 | 7.90 | 7.93 | 7.94 |
| Vitamin mix | 1.00 | 1.00 | 1.00 | 1.00 |
| Bernhardt Tomarelli salt mixture | 4.81 | 4.55 | 4.69 | 4.75 |
| Non-nutritive fiber | 1.00 | 0.95 | 0.99 | 0.99 |
| Cornstarch or sucrose | 69.65 | 69.89 | 70.31 | 70.46 |
| Water | 4.49 | 4.52 | 4.61 | 4.53 |
| Total | 100.00 | 100.00 | 100.00 | 100.00 |

All diets contained 10.0% protein, 8.0% fat, 1.0% fiber, 5.0% ash, and 5.0% moisture.

The protein efficiency ratio (PER), average weight gain and average protein consumed were then measured in accordance with standard AOAC Method 43.212 (1980), using casein as a standard.

As can be seen by a comparison of Runs I and V of Table III below, protein isolates produced in accordance with the present invention exhibit enhanced nutritional value as a evidenced by an approximately 10% greater growth rate in rats, as compared with protein isolates produced by the conventional alkali extraction-/acid precipitation of the prior art. While the nutritional value of the Run V protein isolate was comparable to that of Run IV, which itself comprises an improved procedure developed by the instant inventors featuring the use of degassed water, high extraction temperatures and low extraction times), as shown by Table I, the Run V protein isolate has a color comparable to soy protein isolate and thus is the superior product.

TABLE III

| Protein Source | Ave. Weight Gain (g) | Ave. Protein Consumed (g) | Protein Efficiency Ratio | |
|---|---|---|---|---|
| | | | As Is | Corrected |
| Casein (standard) | 99.4 | 35.3 | 2.81 | 2.50 |
| Sunflower isolate Run I | 42.6 | 29.0 | 1.46 | 1.30 |
| Sunflower isolate Run IV | 52.4 | 31.5 | 1.66 | 1.47 |
| Sunflower isolate Run V | 50.1 | 31.1 | 1.60 | 1.43 |

EXAMPLE II

A series of protein isolates (acid curd form) were prepared from a sunflower meal, prepared as in Example I, by alkali extraction in the presence of various amounts of $NABH_4$ in order to demonstrate the effect of $NaBH_4$ on the color of sunflower protein isolates. In each of these runs 10 g of sunflower meal were extracted with 200 ml of alkali (aqueous sodium hydroxide). The pH of the final extract was 9.0±0.05. Agitation was controlled by a multimixer device set at an intermediate speed. Extraction was performed at 49° C. at times of 5 minutes, 30 minutes, 1 hour and 3 hours. Where used, the $NaBH_4$ was employed in powdered form, and was added to the extract immediately before adjusting the pH to 9.0. At the conclusion of the extraction step, the liquid protein extract phase was separated from the spent meal by centrifuging at 2520×g for 10 minutes using a Sorvall RC-5 Superspeed Refrigerated Centrifuge. An acid curd was thereafter recovered from each of the resulting liquid protein extract phases and the color thereof evaluated as in Example I.

The results of these experiments are set forth in Table IV. As can be seen from this table, the presence of $NaBH_4$ during the alkali extraction produced protein isolates (in acid curd form) having improved color as compared with protein isolates (in acid curd form) prepared by the conventional procedures of the prior art. Moreover, while larger amounts of $NaBH_4$ were required to produce protein isolates of preferred color (an L-value of greater than 68, an a-value of greater than −2.0, and a b-value of greater than 1.5) at extended extraction times, protein isolates of acceptable quality were obtainable with the use of the invention process even under such unfavorable conditions as a three hour extraction time. In contrast, protein isolates prepared by the prior art using a three hour extraction time exhibited the undesirable green color which has heretofore limited the use of sunflower isolates in human food applications.

TABLE IV

| $NaBH_4$ (ppm) | 5 min extraction | | | |
|---|---|---|---|---|
| | L | a | b | visual |
| 0 | 70.0 | −1.5 | 3.2 | off-white |
| 50 | 75.1 | −0.1 | 4.9 | white |
| 75 | 75.5 | 0.0 | 5.0 | white |
| 100 | 75.6 | 0.0 | 4.9 | white |
| 200 | 75.5 | 0.4 | 5.0 | white |

| $NaBH_4$ (ppm) | 30 min extraction | | | |
|---|---|---|---|---|
| | L | a | b | visual |
| 0 | 69.6 | −2.4 | 2.5 | gray |
| 50 | 72.2 | −0.6 | 4.4 | white |
| 75 | 73.8 | −0.4 | 4.6 | white |
| 100 | 74.3 | −0.3 | 4.6 | white |
| 200 | 75.1 | 0.2 | 4.2 | white |

| $NaBH_4$ (ppm) | 1 hr extraction | | | |
|---|---|---|---|---|
| | L | a | b | visual |
| 0 | 65.7 | −2.2 | 1.7 | gray |
| 50 | 68.4 | −1.3 | 3.9 | off-white |
| 75 | 68.9 | −0.6 | 4.9 | off-white |
| 100 | 69.8 | −0.6 | 4.2 | white |
| 200 | 70.8 | 0.3 | 4.1 | white |

| $NaBH_4$ (ppm) | 3 hr extraction | | | |
|---|---|---|---|---|
| | L | a | b | visual |
| 0 | 58.9 | −2.9 | −2.2 | green |
| 50 | 59.8 | −3.7 | −0.9 | green |
| 75 | 60.4 | −3.6 | −0.8 | green-gray |
| 100 | 63.6 | −2.3 | 0.8 | gray |
| 200 | 66.2 | −2.2 | 2.3 | gray |

EXAMPLE III

Following the procedure of Example II a series of protein isolates (acid curd form) were prepared from sunflower meal by alkali extracting the meal at temperatures of 5° C., 24° C., 32° C., 49° C., 65° C. and 70° C. for one hour in the presence of 0, 75 and 200 ppm $NaBH_4$ in order to evaluate the effect of temperature on color formation. Color evaluation was performed as in Example II on the acid curd form of the protein isolate. The results of these experiments are set forth in Table V.

As can be seen from the data in this table, further color improvements in sunflower isolates are obtained by performing the extraction at temperatures in excess of 45° C. as compared with the use of the conventional extraction temperatures of the prior art. This result is unexpected since it was previously thought that higher temperatures would accelerate the various chemical reactions occurring during the alkali extraction step which are responsible for green color formation in sunflower isolates.

TABLE V

| Temperature (°C.) | 0 ppm $NaBH_4$ | | | |
|---|---|---|---|---|
| | L | a | b | visual |
| 5 | 60.4 | −4.3 | −2.4 | blue-green |
| 24 | 58.2 | −4.7 | −3.6 | green |
| 32 | 59.3 | −4.6 | −3.2 | green |
| 49 | 65.7 | −2.2 | 1.7 | green-gray |
| 65 | 70.8 | −1.0 | 3.8 | off-white |
| 70 | 70.5 | −0.2 | 4.5 | white |

| Temperature (°C.) | 75 ppm $NaBH_4$ | | | |
|---|---|---|---|---|
| | L | a | b | visual |
| 5 | 71.2 | −0.4 | 3.6 | white |
| 24 | 67.2 | −1.9 | 1.6 | off-white |
| 32 | 65.0 | −2.8 | −0.4 | green-gray |
| 49 | 68.9 | −0.6 | 4.9 | off-white |
| 65 | 71.8 | −0.7 | 4.9 | white |
| 70 | 73.5 | −0.2 | 5.0 | white |

| Temperature (°C.) | 200 pm $NaBH_4$ | | | |
|---|---|---|---|---|
| | L | a | b | visual |
| 5 | 74.3 | −0.3 | 4.0 | white |
| 24 | 74.7 | −0.7 | 4.1 | white |
| 32 | 73.6 | 0.3 | 3.8 | white |
| 49 | 70.8 | 0.3 | 4.1 | white |
| 65 | 74.9 | −0.8 | 4.6 | white |
| 70 | 74.3 | −0.5 | 5.2 | white |

Although the invention has been described with preferred embodiments, it is to be understood that variations and modifications may be employed as will be apparent to those skilled in the art. Such variations and modifications are to be considered within the scope of the claims appended hereto.

What is claimed is:

1. An improved process for the preparation of protein isolates from a vegetable protein source, comprising the steps of:
   a. extracting said vegetable protein source with alkali in the presence of an alkali metal borohydride to produce a spent vegetable protein source phase and an aqueous protein extract phase, said alkali metal borohydride being present in an amount sufficient to improve the color, palatability and/or nutritional characteristics of the resulting protein isolate;
   b. acid precipitating protein from said aqueous protein extract phase; and
   c. recovering the precipitated protein of step (b) in the form of a protein isolate.

2. The process of claim 1, wherein said vegetable protein source comprises a vegetable meal prone to color formation and said alkali metal borohydride is present in an amount sufficient to produce a protein isolate having a color, as measured by a Hunter Colorimeter, characterized by an L-value of greater than about 60, an a-value of greater than about −4.0 and a b-value of greater than about 1.5.

3. The process of claim 2, wherein said alkali metal borohydride is present in an amount sufficient to produce a protein isolate, as measured by a Hunter Colorimeter, characterized by an L-value of about 68 or higher, an a-value of about −2.0 or higher, and a b-value of about 1.5 or higher.

4. The process of claim 2, wherein said vegetable meal is sunflower meal and said meal is extracted with an alkali solution having a pH of from about 8.5 to 10 for a time of less than about 2 hours at a temperature of from about 5° to 70° C. in the presence of at least about 20 ppm of alkali metal borohydride, based on the combined weight of meal and extracting alkaline solution.

5. The process of claim 4, wherein said meal is extracted for about 30 minutes or less at a temperature of from about 45° to about 55° C. in the presence of from about 75 to about 200 ppm of alkali metal borohydride.

6. The process of claim 4, wherein said alkali metal borohydride is sodium borohydride.

7. An improved process for the preparation of a sunflower protein isolate from sunflower meal, comprising the steps of:

a. extracting said sunflower meal with an alkali solution in the presence of an alkali metal borohydride to produce a spent meal phase and an aqueous protein extract phase, said alkali metal borohydride being present in an amount sufficient to produce a protein isolate having a color, as measured by a Hunter Colorimeter, characterized by an L-value of greater than about 60, an a-value of greater than about −4.0, and a b-value of greater than about 1.5;

b. acid precipitating protein from said aqueous protein extract phase; and c. recovering the precipitated protein of step (b) in the form of a sunflower protein isolate.

8. The process of claim 7, wherein said sunflower meal is extracted at a pH of from about 8.5 to 10 for about 30 minutes or less at a temperature of from about 45° to about 55° C. in the presence of from about 75 to about 200 ppm of alkali metal borohydride, based on the combined weight of sunflower meal and extracting alkali solution.

9. The process of claim 8 wherein said alkali metal borohydride is sodium borohydride.

* * * * *

UNITED STATES PATENT AND TRADEMARK OFFICE
CERTIFICATE OF CORRECTION

PATENT NO. : 4,402,874
DATED : September 6, 1983
INVENTOR(S) : Lawrence A. Johnson and Hwei-mei Wen It is certified that error appears in the above—identified patent and that said Letters Patent is hereby corrected as shown below:

Delete "Thiokol Corporation, Chicago, Ill." at Number (73) on Cover Page.

Column 2, line 68, delete "dithionate" and insert therefor --dithionite--.

Column 5, Line 16, delete "of" and insert therefor --to--.

Column 6, line 1, delete "metal' and insert therefor --meal--.

Column 7, line 53, delete "of" and insert therefor --at--.

Column 12, Table V, Line 24, delete "pm" and insert therefor --ppm--.

Signed and Sealed this

Nineteenth Day of March 1985

[SEAL]

Attest:

DONALD J. QUIGG

Attesting Officer

Acting Commissioner of Patents and Trademarks